(12) United States Patent
Sato et al.

(10) Patent No.: US 11,679,779 B2
(45) Date of Patent: Jun. 20, 2023

(54) DRIVING SUPPORT DEVICE, DRIVING SUPPORT METHOD, AND STORAGE MEDIUM

(71) Applicant: HONDA MOTOR CO., LTD., Tokyo (JP)

(72) Inventors: Masayuki Sato, Wako (JP); Takashi Nishioka, Wako (JP); Tomoko Nishino, Wako (JP); Yuki Murayama, Wako (JP); Kazuasa Suzuki, Wako (JP); Yuya Kishimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/673,834

(22) Filed: Feb. 17, 2022

(65) Prior Publication Data

US 2022/0266851 A1 Aug. 25, 2022

(30) Foreign Application Priority Data

Feb. 25, 2021 (JP) .............................. JP2021-028446

(51) Int. Cl.
*B60W 50/14* (2020.01)
*B60W 40/08* (2012.01)
(Continued)

(52) U.S. Cl.
CPC ............. *B60W 50/14* (2013.01); *B60K 35/00* (2013.01); *B60W 40/02* (2013.01); *B60W 40/08* (2013.01);
(Continued)

(58) Field of Classification Search
CPC ...... B60W 50/14; B60W 40/02; B60W 40/08; B60K 35/00; B60K 2370/166; B60K 2370/1868
See application file for complete search history.

(56) References Cited

U.S. PATENT DOCUMENTS 9,478,150 B1 * 10/2016 Fields ................. G01C 21/3676
10,297,092 B2 * 5/2019 Schaffer ................. B60W 40/08
(Continued)

FOREIGN PATENT DOCUMENTS

JP 2004-171060 6/2004
JP 2009-157685 7/2009
(Continued)

OTHER PUBLICATIONS

Japanes Office Action for Japanese Patent Application No. 2021-028446 dated Aug. 23, 2022.

*Primary Examiner* — Chico A Foxx
(74) *Attorney, Agent, or Firm* — Amin, Turocy & Watson, LLP

(57) ABSTRACT

Provided is a driving support device including a storage device and a hardware processor, the hardware processor executing a program stored in the storage device to: acquire, from a mobile object, information on existence of a specific situation on a planned travel route, which is set as a route to a destination set by an occupant of the mobile object; plan a coaching item, including notification of warning information relating to traveling of the mobile object and suggestion relating to traveling of the mobile object, based at least on the information; and control a notification device so as to execute the notification and suggestion based on the planed coaching item.

14 Claims, 9 Drawing Sheets

(51) Int. Cl.
  *B60W 40/02*  (2006.01)
  *B60K 35/00*  (2006.01)
(52) U.S. Cl.
  CPC ............ *B60K 2370/166* (2019.05); *B60K 2370/1868* (2019.05)

(56) References Cited

U.S. PATENT DOCUMENTS

| | | | | |
|---|---|---|---|---|
| 11,568,755 | B1 * | 1/2023 | Hsu-Hoffman | G09B 9/052 |
| 2009/0312945 | A1 * | 12/2009 | Sakamoto | G08G 1/091 |
| | | | | 701/532 |
| 2012/0135382 | A1 * | 5/2012 | Winston | G09B 19/167 |
| | | | | 434/65 |
| 2015/0262484 | A1 * | 9/2015 | Victor | G09B 9/04 |
| | | | | 701/1 |
| 2016/0027305 | A1 * | 1/2016 | Inaba | G08G 1/0112 |
| | | | | 340/905 |
| 2016/0046297 | A1 * | 2/2016 | Kawakami | G01C 21/26 |
| | | | | 701/29.1 |
| 2016/0117928 | A1 * | 4/2016 | Hodges | G06F 3/04842 |
| | | | | 701/99 |
| 2017/0016737 | A1 * | 1/2017 | Takahara | G08G 1/0129 |
| 2017/0080942 | A1 * | 3/2017 | Nakada | B60W 50/0097 |
| 2017/0213401 | A1 * | 7/2017 | Schaffer | G07C 5/0816 |
| 2017/0305434 | A1 * | 10/2017 | Ratnasingam | B60W 50/14 |
| 2018/0196428 | A1 * | 7/2018 | Pilutti | B60W 30/18 |
| 2018/0197440 | A1 * | 7/2018 | Ramachandra | B60W 50/14 |
| 2019/0144004 | A1 * | 5/2019 | Mimura | G01C 21/3635 |
| | | | | 701/28 |
| 2019/0147740 | A1 * | 5/2019 | Hellberg | G08G 1/093 |
| | | | | 340/905 |
| 2019/0164451 | A1 * | 5/2019 | Gaither | H04W 4/70 |
| 2019/0164452 | A1 * | 5/2019 | Hsu-Hoffman | G09B 19/167 |
| 2019/0225238 | A1 * | 7/2019 | Murakami | B60W 40/109 |
| 2020/0264608 | A1 * | 8/2020 | Rosati | G06N 5/045 |
| 2021/0188304 | A1 * | 6/2021 | Baer | B60W 40/09 |

FOREIGN PATENT DOCUMENTS

| | | | | |
|---|---|---|---|---|
| JP | 2012-006485 | | 1/2012 | |
| WO | WO-2015113573 | A1 * | 8/2015 | ............ B60K 35/00 |
| WO | WO-2018022069 | A1 * | 2/2018 | ............ A61B 5/18 |
| WO | WO-2021155294 | A1 * | 8/2021 | |

* cited by examiner

FIG. 3

| ID | SPECIFIC SITUATION | COACHING CONTENT | DRIVING SKILL LEVEL PRIORITY | SAFETY PRIORITY | TOTAL PRIORITY | USER-SPECIFIED PRIORITY |
|---|---|---|---|---|---|---|
| 100 | ACCIDENT | LANE CHANGE | 3 | 1 | 4 | NOT SPECIFIED |
| 101 | FREEZING | ADVANCED BRAKING | 1 | 2 | 3 | SPECIFIED |
| 102 | CONSTRUCTION WORK | LANE CHANGE | 3 | 3 | 6 | NOT SPECIFIED |
| 103 | TRAFFIC JAM | INTERMEDIATE BRAKING | 1 | 4 | 5 | SPECIFIED |
| 104 | NARROW ROAD | CENTER DRIVING | 1 | 5 | 6 | NOT SPECIFIED |
| 105 | DOWNHILL | ELEMENTARY BRAKING | 1 | 6 | 7 | NOT SPECIFIED |
| 106 | WINDING | CURVE DRIVING | 2 | 7 | 9 | NOT SPECIFIED |
| ... | ... | ... | ... | ... | ... | ... |

FIG. 5
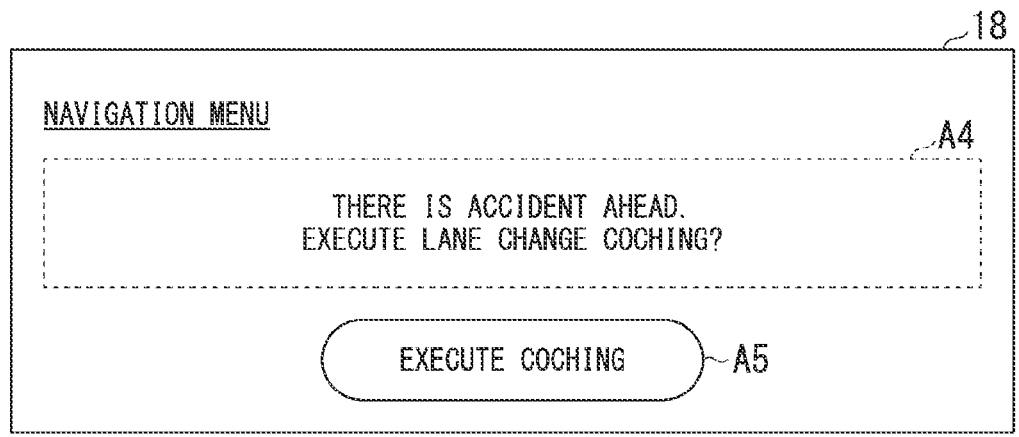

FIG. 6
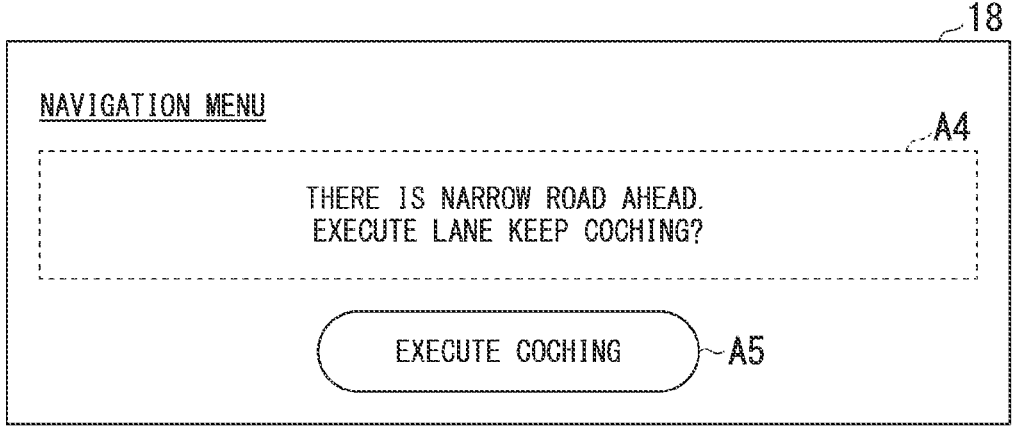
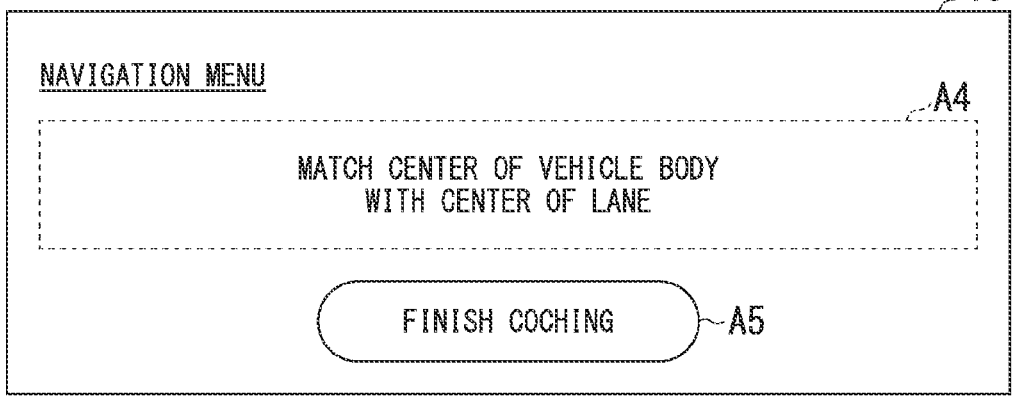

DRIVING SUPPORT DEVICE, DRIVING SUPPORT METHOD, AND STORAGE MEDIUM

CROSS-REFERENCE TO RELATED APPLICATION

Priority is claimed on Japanese Patent Application No. 2021-028446, filed Feb. 25, 2021, the content of which is incorporated herein by reference.

BACKGROUND

Field of the Invention

The present invention relates to a driving support device, a driving support method, and a storage medium.

Description of Related Art

Technologies for evaluating the operation of a vehicle by a driver are known. For example, Patent Document 1 discloses a technology for evaluating the driving of a vehicle based on a comparison between an ideal target, which is a driving target, and an actual operation value corresponding to an actual operation of the vehicle.

SUMMARY

However, the technology described in Patent Document 1 evaluates driving based on general indicators such as speed and acceleration, and does not evaluate driving in a flexible manner according to the specific situation in which the driver is placed. The present invention has been made in consideration of such a situation, and an object thereof is to provide a driving support device, a driving support method, and a program, which are capable of evaluating driving more flexibly.

(1): According to one aspect of the present invention, there is provided a driving support device including a storage device and a hardware processor, the hardware processor executing a program stored in the storage device to: acquire, from a mobile object, information on existence of a specific situation on a planned travel route, which is set as a route to a destination set by an occupant of the mobile object; plan a coaching item, including notification of warning information relating to traveling of the mobile object and suggestion relating to traveling of the mobile object, based at least on the information; and control a notification device so as to execute the notification and suggestion based on the planed coaching item.

(2) In the aspect of (1), the storage device stores a driving skill level of the occupant, which has been evaluated when the mobile object has passed through the same situation as the specific situation, and the hardware processor determines, based on the driving skill level, whether or not to plan the coaching item corresponding to the specific situation.

(3) In the aspect of (2), the higher driving skill level is represented by a larger value, and the hardware processor determines not to plan the coaching item corresponding to the specific situation when the driving skill level is equal to or larger than a threshold value.

(4) In the aspect of (2), the higher driving skill level is represented by a larger value, and when the hardware processor is allowed to plan a plurality of coaching items corresponding to a plurality of specific situations within the same period, the hardware processor plans one coaching item out of the plurality of coaching items based on a first priority that gives a priority to a coaching item requiring a small driving skill level among the plurality of specific situations.

(5) In the aspect of (4), the hardware processor plans one coaching item out of the plurality of coaching items based further on a second priority, which indicates a degree of necessity to ensure safety of the mobile object and is set for each of the plurality of specific situations.

(6) In the aspect of (5), when the number of times of execution of a coaching item planned based on the second priority is equal to or larger than a threshold value, the hardware processor decreases the second priority of the coaching item.

(7) In the aspect of (5), the hardware processor acquires external information, which is information on objects around the mobile object, the hardware processor generates reference information indicating a specific situation based on the external information, and when the reference information satisfies a predetermined condition at the time of execution of a planned coaching item, the hardware processor stops executing the planned coaching item.

(8) In the aspect of (1), the hardware processor displays, to the occupant, information asking whether or not the planned coaching item needs to be performed.

(9) In the aspect of (1), the specific situation is entry into a narrow road, the hardware processor causes the notification device to execute the notification at a location a predetermined distance before a location of entry into the narrow road, and when the mobile object enters into the narrow road, the hardware processor causes the notification device to execute a suggestion relating to an offset amount from a center line of a lane in which the mobile object is traveling.

(10) In the aspect of (9), the hardware processor causes the notification device to execute the notification when a driving load imposed on the occupant is small at a location a predetermined distance before the location of entry into the narrow road.

(11): According to one aspect of the present invention, there is provided driving support method to be executed by a computer, the driving support method including: acquiring, from a mobile object, information on existence of a specific situation on a planned travel route, which is set as a route to a destination set by an occupant of the mobile object; planning a coaching item, including notification of warning information relating to traveling of the mobile object and suggestion relating to traveling of the mobile object, based at least on the information; and controlling a notification device so as to execute the notification and suggestion based on the planed coaching item.

(12): According to one aspect of the present invention, there is provided a non-transitory storage medium having stored thereon a program for causing a computer to: acquire, from a mobile object, information on existence of a specific situation on a planned travel route, which is set as a route to a destination set by an occupant of the mobile object; plan a coaching item, including notification of warning information relating to traveling of the mobile object and suggestion relating to traveling of the mobile object, based at least on the information; and control a notification device so as to execute the notification and suggestion based on the planed coaching item.

According to the aspects of (1) to (12), driving can be evaluated more flexibly according to the planned route of the moving object.

According to the aspects of (2) to (4), coaching can be planned appropriately according to the driving skill level of the occupant.

According to the aspect of (5) or (6), coaching can be planned appropriately according to the degree of necessity to ensure the safety of the mobile object.

According to the aspect of (7), coaching can be performed flexibly based on external information.

According to the aspect of (8), it is possible to flexibly determine whether or not to perform coaching according to the occupant's needs.

According to the aspect of (9) or (10), it is possible to appropriately assist the occupant to enter a narrow road.

BRIEF DESCRIPTION OF THE DRAWINGS

FIG. 3 shows an example of the structure of a coaching item table stored in a storage.

FIG. 5 shows an example of notification of warning information and suggestion relating to traveling, which are displayed on the navigation device.

FIG. 6 shows another example of the notification of warning information and suggestion relating to traveling, which are displayed on the navigation device.

DETAILED DESCRIPTION

Now, a driving support device, a driving support method, and a program according to an embodiment of the present invention is described with reference to the drawings.

[Configuration]

Figure 1:
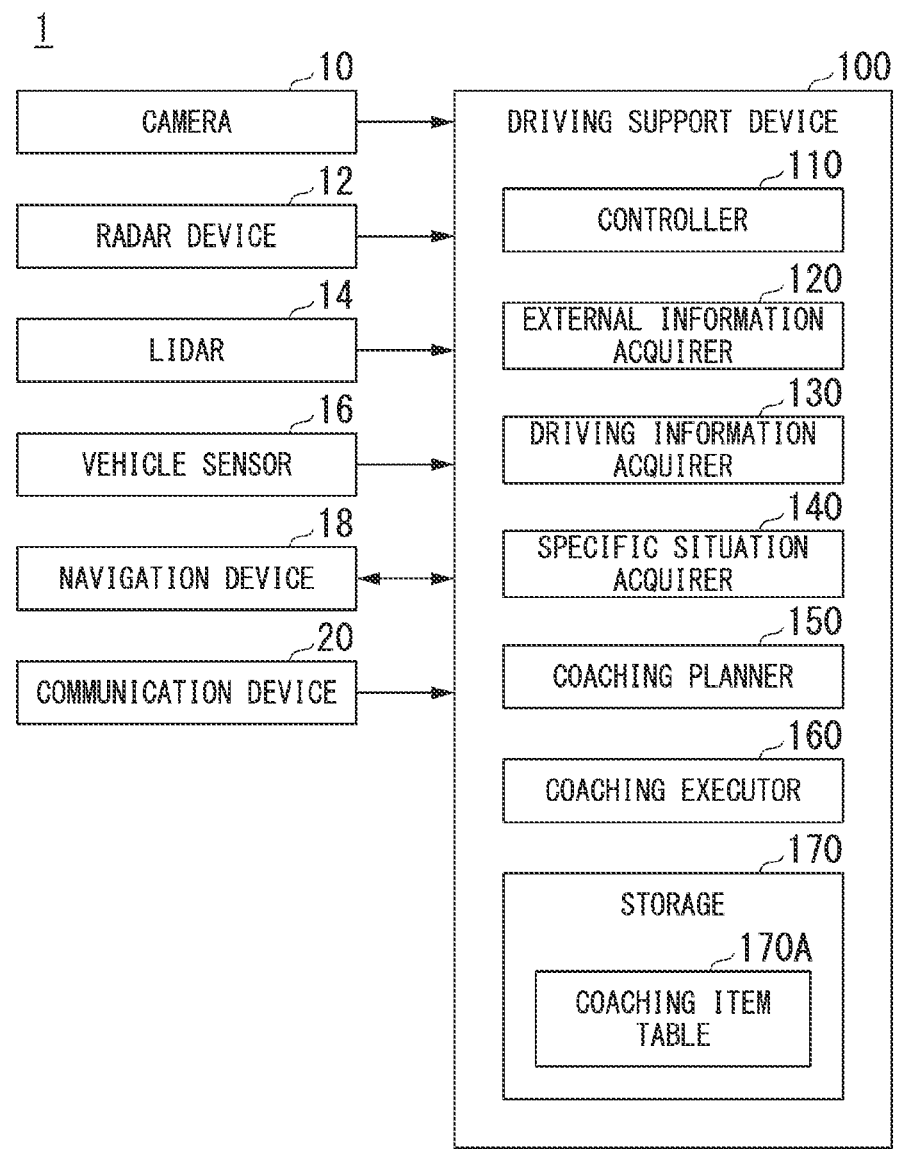
FIG. 1 shows an example of the functional configuration of a driving support system installed in a host vehicle.

FIG. 1 shows an example of the functional configuration of a driving support system 1 installed in a vehicle M. The driving support system 1 includes a camera 10, a radar device 12, a LIDAR 14, a vehicle sensor 16, a navigation device 18, and a communication device 20. The host vehicle M is an example of a "mobile object".

The camera 10 is a digital camera that uses a solid-state image sensor such as CCD (Charge Coupled Device) or CMOS (Complementary Metal Oxide 35 Semiconductor). The camera 10 can be attached to any part of the host vehicle M. When capturing images of the front of the vehicle, the camera 10 can be mounted on the top of the front windshield, the back of the room mirror, etc. The camera 10, for example, repeatedly and periodically takes images of the surroundings of the host vehicle M. The camera 10 may be a stereo camera.

The radar device 12 radiates radio waves such as millimeter waves around the host vehicle M and detects the position (distance and direction) of at least one object by detecting the radio waves (reflected waves) reflected by the object. The radar device 12 can be installed at any point of the host vehicle M. The radar device 12 may detect the position and speed of an object using the FM-CW (Frequency Modulated Continuous Wave) method.

The LIDAR 14 irradiates light (or electromagnetic waves with wavelengths similar to light) in the vicinity of the host vehicle M and measures the scattered light. The LIDAR 14 detects the distance to the target based on the time between emission and reception of light. The irradiated light is, for example, pulsed laser light. The LIDAR 14 can be attached to any part of the host vehicle M.

The vehicle sensor 16 includes a speed sensor to detect the speed of the host vehicle M, an acceleration sensor to detect acceleration, a yaw rate sensor to detect angular velocity around the vertical axis, an orientation sensor to detect the direction of the host vehicle M, etc.

The navigation device 18 has a GNSS (Global Navigation Satellite System) receiver, map information (navigation map), a touch panel display device that functions as a user interface, a speaker, a microphone, etc The navigation device 18 uses the GNSS receiver to identify the position of the host vehicle M, and derives a route from that position to a destination specified by the user. The position of the host vehicle M may be identified or supplemented by an Inertial Navigation System (INS) using the output of the vehicle sensor 16. The navigation device 18 provides guidance by voice and navigation display relating to the route leading to the destination when the occupant is driving the host vehicle M. The navigation device 18 may be realized, for example, by the functions of a terminal device such as a smartphone or tablet device owned by the user. In this case, information is sent and received through wireless or wired communication between the terminal device and the driving support device 100. The display device, speaker, microphone, etc. mounted on the navigation device 18 is an example of a "notification device".

The communication device 20 performs wireless communication using, for example, cellular networks, WiFi networks, Bluetooth (registered trademark), and DSRC (Dedicated Short Range Communication). The communication device 20 wirelessly communicates with the information-providing server of a system that monitors traffic conditions on roads, such as VICS (Vehicle Information and Communication System; registered trademark), and obtains information indicating the traffic conditions on the road on which the host vehicle M is traveling or is scheduled to travel (hereinafter referred to as traffic information). The traffic information includes information on traffic congestion ahead, time required at congested points, information on accidents, broken-dhost vehicles, construction work, narrow roads, downhill, winding, icy roads, and information on speed and lane restrictions. In addition, the communication device 20 may acquire the above traffic information distributed by the membership service of the automobile manufacturer, or acquire the above traffic information by communicating with wireless beacons installed in the side belts of the road, etc., or conducting inter-vehicle communication with other vehicles driving around the host vehicle M.

The driving support device 100 includes, for example, a controller 110, an external information acquirer 120, a driving information acquirer 130, a specific situation acquirer 140, a coaching planner 150, a coaching executor 160, and a storage 170. The controller 110, the external information acquirer 120, the driving information acquirer 130, the specific situation acquirer 140, the coaching planner 150, and the coaching executor 160 are each controlled by a hardware processor, such as a CPU (Central Processing Unit), executing a program (software). In addition, some or all of these components can be implemented by LSI (Large Scale Integration), ASIC (Application Specific Integrated Circuit), FPGA (Field-Programmable Gate Array), and GPU (Graphics Processing Unit), etc., or may be realized by the cooperation of software and hardware. The program may be stored in advance in a storage device (a storage device equipped with a non-transitory storage medium) such as HDD or flash memory of the driving support device 100. The program may also be stored in a removable storage medium such as DVD or CD-ROM, and installed in the HDD or flash memory of the driving support device 100 when the storage medium (non-transitory storage medium) is mounted to the drive unit. The storage 170 may be, for example, a ROM (Read Only Memory) 35, a flash memory, an SD card, RAM (Random Access Memory), register, etc.

The controller 110 performs various controls related to navigation and coaching of driving of the host vehicle M by an occupant. Here, coaching means instructing the occupant on how to drive the host vehicle M according to the objectives set by the occupant, such as lane changing and braking, evaluating the driving of the host vehicle M by the occupant who has received the coaching, and communicating the evaluation to the occupant to encourage him/her to improve the driving. For example, in the case of a lane change, the system instructs the occupant to change lanes while maintaining a sufficient lane distance from another vehicle to which the lane change is to be made, and gives a high evaluation to the occupant when the occupant actually drives the host vehicle M as instructed. The controller 110 can, for example, display a navigation screen on the navigation device 18 for the occupant to select a destination and to specify the content of the coaching to be prioritized. The controller 110, for example, displays a navigation screen on the navigation device 18 for the occupant to select a destination or to specify the coaching content to be prioritized, or receives the occupant's selection entered on the navigation menu screen of the navigation device 18 and executes processing corresponding to the selection.

Figure 2:
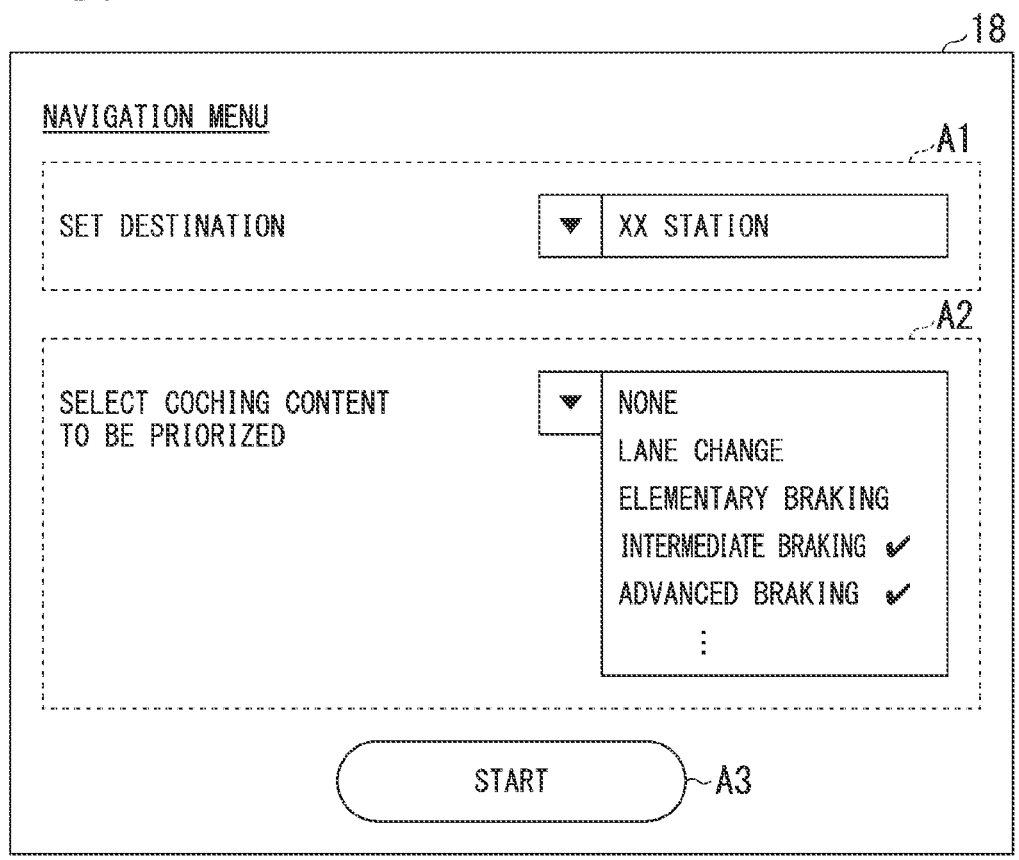
FIG. 2 shows an example of a coaching menu screen that a controller displays on a navigation device.

FIG. 2 shows an example of a navigation menu screen displayed by the controller 110 on the navigation device 18. In FIG. 2, an area A1 shows a drop-down list for selecting a destination. An area A2 shows a drop-down list for selecting coaching content prioritized by the occupant. An area A3 shows a button to start driving the host vehicle M with the selected destination and coaching content activated. When the occupant presses the said button, the navigation device 18 generates a route to reach the destination and displays the generated route on the display device.

In this embodiment, for convenience of explanation, the input/output functions for navigation and the input/output functions for coaching are integrated into the navigation device 18 as shown in FIG. 2. However, the present invention is not limited to such a configuration, and the input/output functions for navigation and the input/output functions for coaching may be realized as separate devices.

The external information acquirer 120 performs sensor fusion processing on the detection results of some or all of the camera 10, the radar device 12, and the LIDAR 14 to acquire external information such as the types of peripheral objects that exist around the host vehicle M and the relative positions and relative speeds of such peripheral objects with respect to the host vehicle M.

The driving information acquirer 130 acquires driving information including the speed and acceleration of the host vehicle M from the vehicle sensor 16.

The specific situation acquisition section 140 acquires, from the communication device 20, information on the existence of a specific situation on the route to the destination 35 set by the occupant of the host vehicle M on the navigation menu screen. Here, the specific situation indicates a situation in which the occupant needs to pay attention when driving the host vehicle M, such as an accident, freezing, construction, traffic jam, narrow road, downhill, winding, etc., and is obtained from the traffic information described above.

The coaching planner 150 plans one or more coaching items including notification of warning information on driving of the host vehicle M and a suggestion relating to driving of the host vehicle M based on the route information acquired from the navigation device 18 and the information on the existence of a specific situation acquired from the specific situation acquisition section 14. In this embodiment, "coaching item" means a set of notification of warning information and a suggestion relating to driving under a certain specific situation. Also, "planning of a coaching item" means deciding to execute notification of the warning information and a suggestion relating to driving corresponding to the coaching item. For example, when two specific situations, an accident and a traffic jam, are detected based on the information obtained from the specific situation acquirer 140 on the route acquired from the navigation device 18, the coaching planner 150 plans a coaching item for the accident and a coaching item for the traffic jam.

The coaching executor 160 controls the navigation device 18 to execute the notification and suggestion corresponding to the coaching item based on the coaching item planned by the coaching planner 150. Specifically, the coaching executor 160 controls the navigation device 18 so that when the host vehicle M traveling along the route set by the navigation device 18 has reached a point a predetermined distance before the point corresponding to the specific situation, the navigation device 18 executes notification of the warning information, and then executes a suggestion relating to driving when the host vehicle M has reached the point corresponding to the specific situation. For example, if the coaching planner 150 plans a coaching item for an accident and a coaching items for a traffic jam in this order, the coaching execution section 160 controls the navigation device 18 so that the navigation device 18 first executes notification of the warning information for the accident, followed by the suggestion relating to driving against the accident, followed by notification of the warning information for the traffic jam, followed by the suggestion relating to driving against the traffic jam. When the coaching executor 160 has controlled the navigation device 18 so as to execute the suggestion relating to driving, the coaching executor 160 measures the driving skill level indicating an evaluation of how well the host vehicle M is traveling in accordance with the suggestion, and sets the measured driving skill level as a driving skill level priority to be described later.

The coaching executor 160 further detects a specific situation based on the external information obtained from the external information acquirer 120, and generates the content of the detection as reference information. For example, when the coaching executor 160 detects freezing in the external information using a method such as pattern matching, the fact that freezing has been detected is generated as reference information. As will be described in detail later, when executing a coaching item planned in advance, the coaching executor 160 stops executing the planned coaching item if the reference information satisfies a predetermined condition.

The storage 170 stores a coaching item table 170A that shows detailed information about each coaching item. FIG. 3 shows an example of the configuration of the coaching item table 170A stored in the storage 170. The coaching item table 170A is created for each occupant of the host vehicle M, and stores information such as the specific situation, coaching content, driving skill level priority, safety priority, total priority, and user-specified priority, etc., in association with an ID.

The specific situation is, as described above, information indicating a situation in which the occupant needs to pay attention in driving the host vehicle M. The coaching executor 160 refers to the specific situation in execution of notification of the warning information and controls the navigation device 18 so as to execute notification of the warning information according to the specific situation. For example, if the specific situation is an accident, the coaching executor 160 sends a message such as "There is an accident ahead".

The coaching content is information that indicates the content of coaching to be executed in the corresponding specific situation. The coaching executor 160 refers to the coaching content in execution of a suggestion relating to driving, and controls the navigation device 18 so as to execute the suggestion relating to driving according to the coaching content. For example, when the specific situation is an accident, the coaching content is a lane change, and thus the coaching executor 160 causes the navigation device 18 to suggest, for example, "Keep a sufficient distance from the accident site and change lanes".

The driving skill level priority is information that indicates the driving skill level of the occupant, which is evaluated when the host vehicle M passes through the same situation as the corresponding specific situation. As the numerical value of the driving skill level priority becomes higher, the driving skill level of the occupant becomes higher. Based on the driving skill level priority, the coaching planner 150 determines whether or not to plan a coaching item according to the corresponding specific situation. For example, if the driving skill level priority is greater than or equal to a threshold value, the coaching planner 150 determines that the driving skill level of the occupant in the corresponding specific situation is sufficiently high and determines that the coaching item is not to be planned. The driving skill level priority is an example of the "first priority".

The safety priority is information that indicates the level of necessity to ensure the safety of the host vehicle M, which is set for the corresponding specific situation. As the value of the safety priority becomes lower, the need to ensure the safety of the host vehicle M becomes higher. Based further on the safety priority, the coaching planner 150 determines whether or not to plan a coaching item according to the corresponding specific situation. For example, if the number of times a certain coaching item has been performed is greater than or equal to a threshold, the coaching planner 150 determines that the occupant is proficient in driving related to the coaching item, and lowers the safety priority. Specifically, the coaching planner 150 can lower the safety priority by adding a predetermined value to the safety priority. The safety priority is an example of a "second priority".

The total priority is information that indicates the sum of the driving skill level priority and the safety priority. If a plurality of coaching items can be planned for a plurality of specific situations within the same period of time, the coaching planner 150 compares the total priorities of the plurality of coaching items, and selects and plans a coaching item with the highest total priority (i.e., the lowest total priority value). If there is more than one coaching item with the same total priority, the coaching planner 150 selects a coaching item with the highest safety priority (i.e., the lowest safety priority value). If there is a plurality of coaching items with the same safety priority, the coaching planner 150 selects a coaching item with the highest driving skill level priority (i.e., the lowest driving skill level priority value).

The user-specified priority is information that specifies whether or not the corresponding coaching content is to be executed with priority. The user-specified priority is specified by the user selecting a coaching content the area A2 of the navigation menu screen shown in FIG. 2. If a plurality of coaching items can be planned for a plurality of specific situations within the same period of time, the coaching planner 150 selects and plans the coaching item for which the user-specified priority is set to "Yes" with priority.

[Action]

Figure 4:
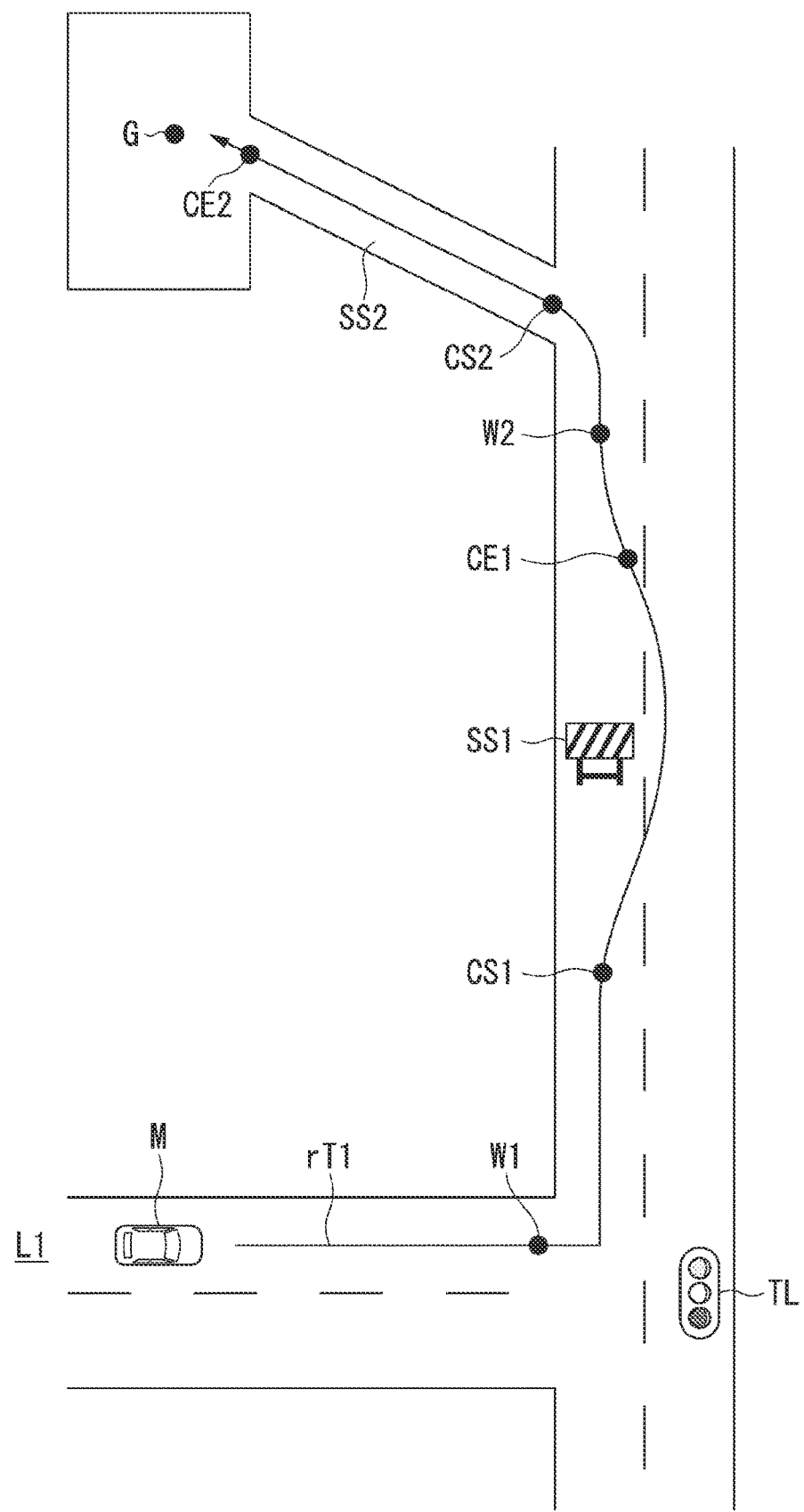
FIG. 4 shows an example of a scene in which a coaching planner plans a coaching item.

Next, with reference to FIG. 4 to FIG. 10, the operation of the driving support device 100 will be described in more detail. FIG. 4 shows an example of a scene in which the coaching planner 150 plans a coaching item. In FIG. 4, the host vehicle M is traveling in lane L1, and the navigation device 18 generates a route rT1 to the destination G. A route rT1 to the destination G is generated by the navigation system 18. On the route rT1, the communication device 20 detects an accident as a specific situation SS1. On the route rT1, the communication device 20 detects an accident as the specific situation SS1, and then detects a narrow road as the specific situation SS2. At this time, the coaching planner 150 plans a coaching item corresponding to the accident and a coaching item corresponding to the narrow road. Specifically, the coaching planner 150 sets a point W1, where warning information is reported in response to the specific situation SS1, a point W2, where warning information is reported in response to the specific situation SS2, a point CS2, where a suggestion relating to driving is started in response to the specific situation SS2, and a point CE2, where a suggestion relating to driving is ended in response to the specific situation SS2.

When the host vehicle M travels along the lane L1 and reaches the point W1, the coaching executor 160 determines whether the driving load imposed on the occupant of the host vehicle M is small or not. For example, the coaching executor 160 determines that the driving load is small when the host vehicle M is making a stop in front of a traffic light or when the host vehicle M is traveling at a cruising speed. In the case of FIG. 4, since the host vehicle M stops in front of the traffic light TL, the coaching executor 160 determines that the driving load is small.

When the coaching executor 160 determines that the driving load imposed on the occupant of the host vehicle M is small, the coaching executor 160 causes the navigation device 18 to execute notification of the warning information for the specific situation SS1 at the point W1. FIG. 5 shows an example of notification of the warning information displayed on the navigation device 18. In the upper part of FIG. 5, an area A4 shows the content of the warning information for the specific situation SS1. In the area A4, the coaching execution unit 160 prompts the user to pay attention to the specific situation SS1, at the same time, asks the occupant of the host vehicle M whether to execute lane change coaching corresponding to the specific situation SS1.

If the occupant of the host vehicle M presses the button for executing coaching shown in area A5, then when the host vehicle M passes through point CS1, a suggestion relating to driving for the specific situation SS1 is displayed on the navigation device 18. The lower part of FIG. 5 shows a suggestion displayed on the navigation device 18 when the host vehicle M is traveling between the points CS1 and CE1, and a suggestion regarding changing the lane with a sufficient distance from the accident site is displayed. In this way, when the driving load imposed on the occupant of the host vehicle M is small, the coaching can be executed more safely and flexibly by calling attention to specific situations and inquiring whether the coaching should be executed or not.

When the host vehicle M passes point CE1, the suggestion shown in the lower part of FIG. 5 is erased. Thereafter, when the host vehicle M reaches the point W2, which is located a predetermined distance before the point where the host vehicle M enters the narrow road, the coaching executor 160 again determines whether the driving load imposed on the occupant of the host vehicle M is small or not. Then, when the host vehicle M reaches the point W2, which is a predetermined distance before the point where the host vehicle M enters the narrow road, which is the specific situation S2, the coaching executor 160 again determines whether the driving load imposed on the occupant of the host vehicle M is small or not. At this time, since the host vehicle M is traveling at a cruising speed, the coaching executor 160 determines that the driving load is small. Therefore, the coaching executor 160 causes the navigation device 18 to report warning information for the specific situation SS.

FIG. 6 shows another example of notification of the warning information and a suggestion relating to driving displayed on the navigation device 18. In the upper part of FIG. 6, an area A4 shows the content of notification of the warning information for the specific situation SS2. In the area A4, the coaching executor 160 provides the following information for the specific situation SS2, and at the same time, asks the occupant of the host vehicle M whether to execute the lane change coaching corresponding to the specific situation SS2.

If the occupant of the host vehicle M presses the button for executing coaching shown in the area A5, then when the host vehicle M passes through point the CS2, a suggestion relating to driving for the specific situation SS2 is displayed on the navigation device 18. The lower part of FIG. 6 shows a suggestion displayed on the navigation device 18 when the host vehicle M is traveling between the points CS2 and CE2, and the suggestion regarding the amount of offset from the center line of the lane in which the host vehicle M is traveling is displayed. Thereafter, when the host vehicle M reaches the destination G, the coaching executor 160 terminates the coaching. As described above, when the driving load imposed on the occupant of the host vehicle M is small, the coaching can be executed more safely and flexibly by calling attention to a specific situation and inquiring whether the coaching is to be executed or not. If the distance between point W2 and point CS2 is longer than the distance or time required from the coaching suggestion to the completion of the coaching, the coaching may be performed before the point CS2 is reached to help the occupant grasp spacing of the vehicle. Depending on the type of coaching, it is also possible to accustom the occupant's senses by coaching in advance of the vehicle entering a specific state.

Figure 7:
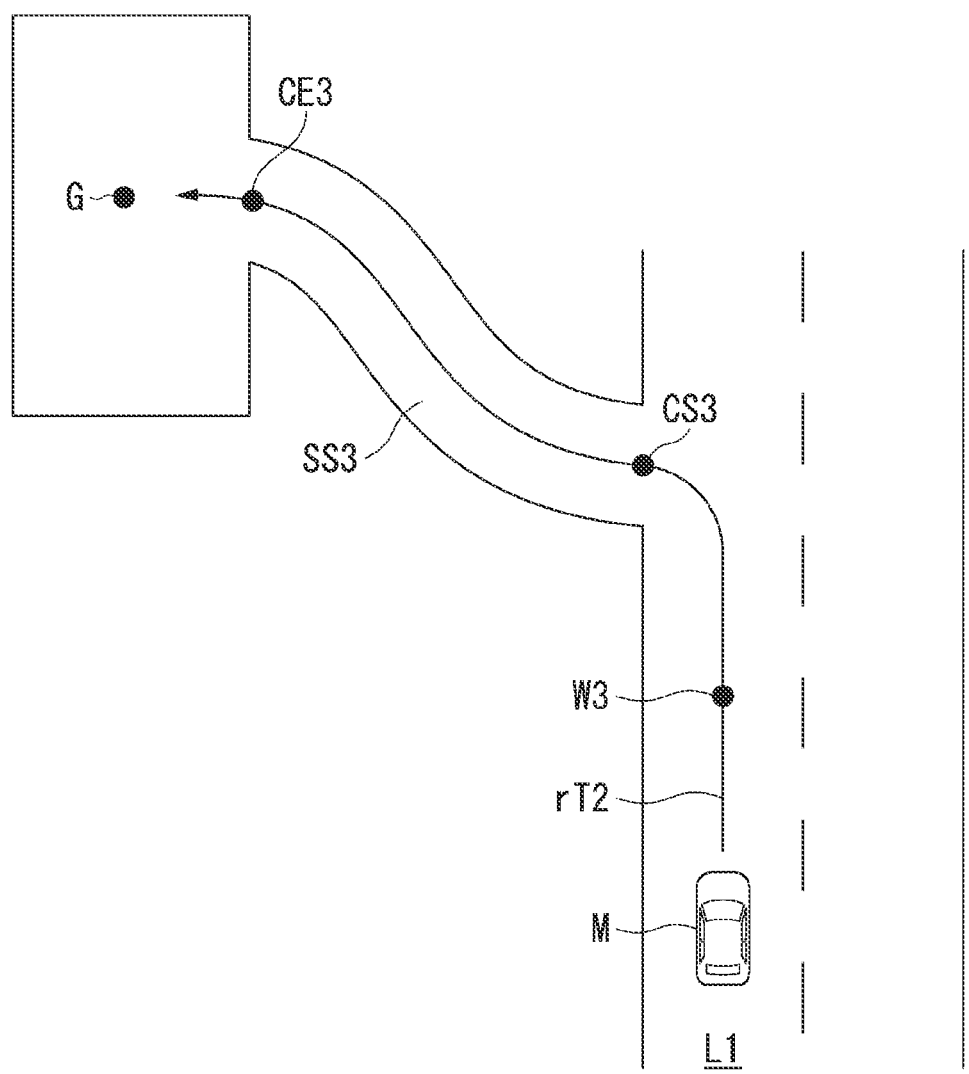
FIG. 7 shows another example of the scene in which the coaching planner plans a coaching item.

FIG. 7 shows another example of a situation in which the coaching planner 150 plans a coaching item. In FIG. 7, the host vehicle M is traveling in lane L1, and a route rT2 to the destination G is generated by the navigation device 18. At this time, a specific situation indicating a narrow road and a specific situation indicating winding are obtained from the communication device 20. Therefore, the coaching planner 150 refers to the coaching item table 170A stored in the storage 170 to determine which of the coaching item corresponding to the narrow road and the coaching item corresponding to winding should be prioritized. In the coaching item table 170A, the total priority of the coaching item corresponding to a narrow road is 6, and the total priority of the coaching item corresponding to winding is 9. Therefore, the coaching planner 150 sets the narrow road as the specific situation SS3, selects the corresponding coaching item, and plans the coaching item. Then, as in the case of FIG. 4, the coaching item is selected and planned. Then, in the same way as in FIG. 4, the coaching executor 160 sends warning information to the navigation device 18 at the point W3, which is a predetermined distance before the point where the vehicle enters the narrow road. Then, if the occupant of the host vehicle M presses the coaching execution button, the coaching executor 160 causes the navigation device 18 to report a suggestion relating to driving when the host vehicle M passes between the points CS3 and CE3.

Figure 8:
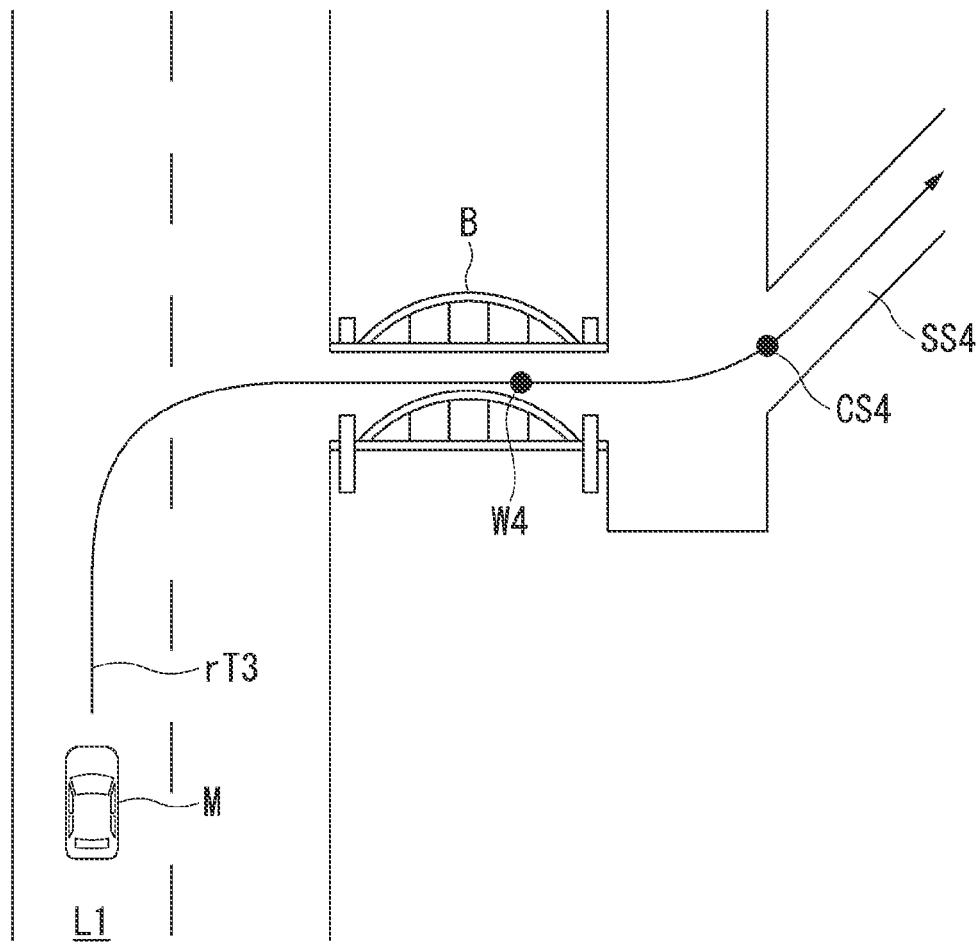
FIG. 8 shows another example of the scene in which the coaching planner plans a coaching item.

FIG. 8 shows yet another example of a situation in which the coaching planning unit 150 plans coaching items. In FIG. 8, the host vehicle M is traveling in lane L1, and the navigation device 18 has generated a route rT3. In addition, the communication device 20 reports a specific situation SS4 indicating a narrow road, and accordingly, the coaching planner 150 sets a point W4 where warning information is reported and a point CS4 where coaching is started.

In this case, under normal circumstances, when the host vehicle M is traveling on the bridge B and reaches the point W4, the coaching executor 16 0 causes the navigation device 18 to report warning information for the specific situation SS4. However, in this scene, it is assumed that even though the road surface is frozen on the bridge B, no information on the freezing was obtained from the communication device 20, while the coaching executor 160 have generated reference information indicating freezing just before entering the bridge B based on the information obtained from the external information acquirer 120.

In this case, the coaching executor 160 refers to the coaching item table 170A to determine which of the coaching items corresponding to freezing and the coaching item corresponding to the specific situation S4, i.e., narrow road, should be prioritized. In the coaching item table 170A, the total priority of the coaching item corresponding to freezing is 3, and the total priority of the coaching item corresponding to the specific situation is 6. Therefore, the coaching executor 160 determines that the coaching item corresponding to freezing is to be prioritized, and stops the execution of the coaching item corresponding to the specific situation SS planned in advance. In other words, the coaching executor 160 executes the coaching item corresponding to the reference information as an interrupt process instead of the coaching item planned in advance. A higher total priority (i.e., a lower total priority value) is an example of a "predetermined condition".

Figure 9:
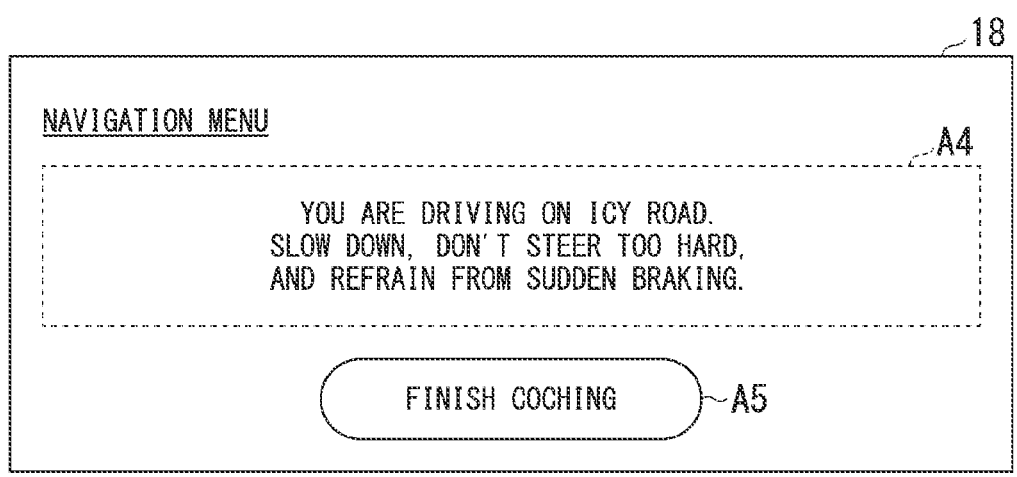
FIG. 9 shows an example of the suggestion relating to driving displayed on the navigation device as a result of interruption processing executed in the scene of FIG. 8.

FIG. 9 shows an example of a suggestion relating to driving displayed on the navigation device 18 as a result of the interrupt process being executed in the scene of FIG. 8. The content of the suggestion relating to driving shown in FIG. 9 is the same as those shown in the lower part of FIG. 5 and FIG. 7. However, unlike the case of FIG. 5 and FIG. 7, when the interruption process is executed, warning information is not reported at the point a predetermined distance before the point of the specific situation. This is because, compared to the case where the information is acquired from the communication device 20, the margin of distance to reach the point of the specific situation is small when information is acquired from the external information acquirer 120. This process allows appropriate coaching to be performed based on the external information even when information cannot be acquired from the communication device 20.

[Operation Flow]

Figure 10:
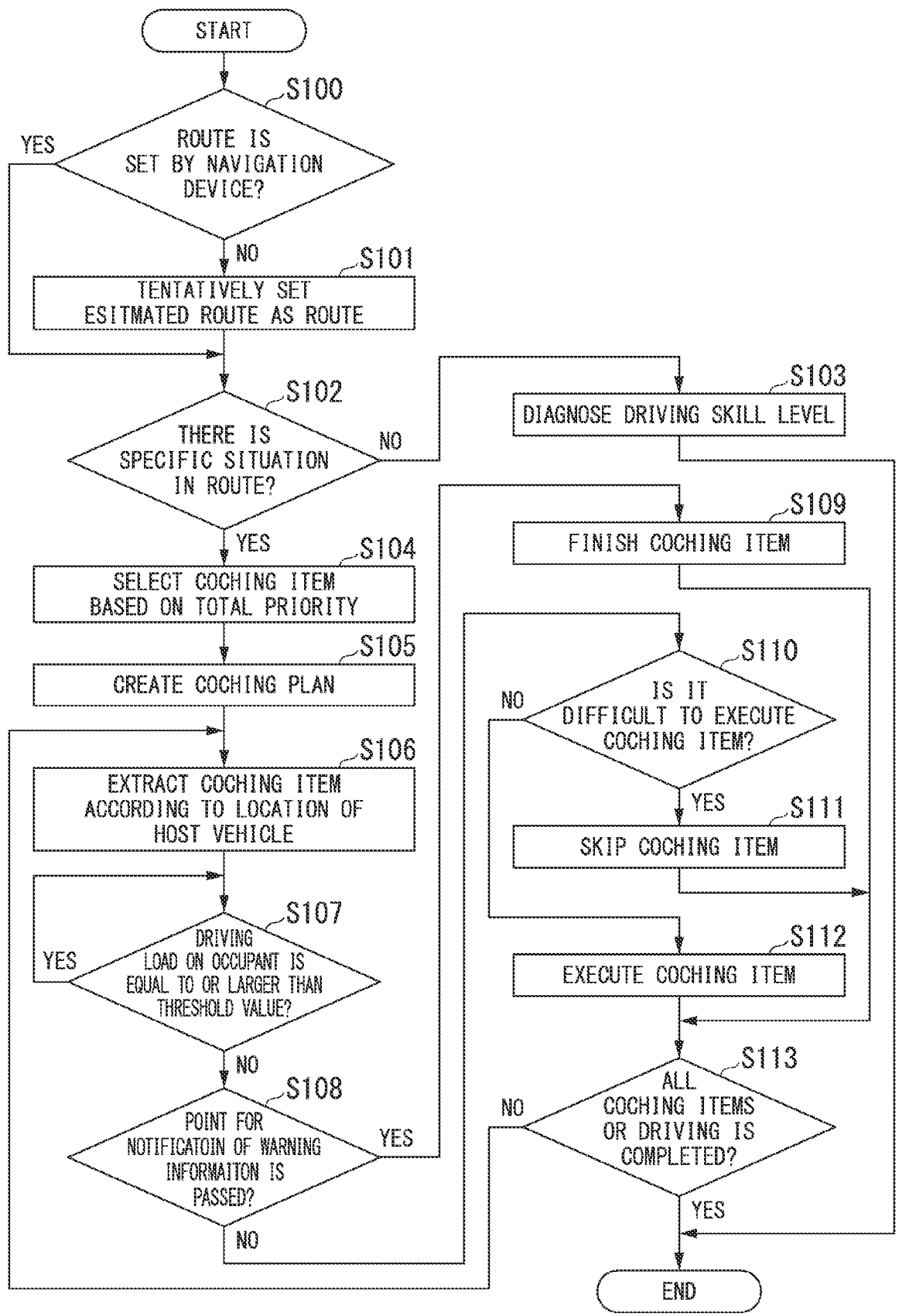
FIG. 10 is a flowchart showing an example of the flow of operations performed by the driving support device.

Next, with reference to FIG. 10, the flow of operations performed by the driving assistance device 100 will be described. FIG. 10 is a flowchart showing an example of the flow of operations performed by the driving support device 100.

First, the driving support device 100 determines whether or not a route has been set by the navigation device 18 (Step S100). When it is determined that the route has not been set by the navigation device 18, the driving support device 100 tentatively sets the route of the previous travel day (or the same day of the previous week) or the route with the closest starting point as the recommended route (Step S101).

Next, the driving support device 100 determines whether or not there is a specific situation on the set route based on the information obtained from the communication device 20 (Step S102). If it is determined that there is no specific situation on the set route, the driving support device 100 diagnoses the driving skill level of the occupant while driving the host vehicle M, and stores the diagnosis result into the table 170A as a driving skill level priority (Step S103). Thereafter, the process of the flowchart is terminated.

On the other hand, if it is determined that there is a specific situation on the set route, the driving support device 100 selects a coaching item based on the total priority of the coaching item corresponding to each specific situation (Step S104). Next, the driving support device 100 defines, based on the selected coaching item, a coaching plan defining the point for reporting warning information and the point for a suggestion relating to driving between the starting point and the destination G of the host vehicle M (Step S105). Next, the driving support device 100 extracts the corresponding coaching item from the coaching plan according to the points of the host vehicle M on the route (Step S106).

Next, the driving support device 100 determines whether or not the driving load of the occupant is larger than a threshold (Step S107). If it is determined that the driving load of the occupant is larger than the threshold, the driving support device 100 waits for a certain period of time and then executes the process of step S107 again. On the other hand, if it is determined that the driving load of the occupant is not larger than the threshold, the driving assistance device 100 next determines whether or not the host vehicle M has already passed the point where the warning information corresponding to the extracted coaching item is to be reported (Step S108).

If it is determined that the host vehicle M has already passed the point where the warning information corresponding to the extracted coaching item is to be reported, the driving assistance device 100 does not execute and terminates the coaching item (Step S109). On the other hand, if it is not determined that the host vehicle M has already passed the point where the warning information corresponding to the extracted coaching item is to be reported, the driving support device 100 determines whether or not it is difficult to execute the coaching item (Step S110).

If it is determined that it is difficult to execute the coaching item, the driving assistance device 100 skips the execution of the coaching item (Step S111). On the other hand, if it is determined that it is not difficult to execute the coaching item, the driving support device 100 executes the coaching item (Step S112). In other words, the driving support device 100 reports warning information corresponding to the coaching item and makes suggestions relating to driving. Next, the driving support device 100 determines whether or not all the coaching items have been completed or the driving of the host vehicle M has been completed (Step S113). If it is not determined that all the coaching items have been completed or the driving of the host vehicle M has been completed, the driving support device 100 returns the process to Step S106 and extracts the next coaching item. On the other hand, if it is determined that all the coaching items have been completed or the driving of the host vehicle M has been completed, the driving support device 100 ends the processing of this flowchart.

In this embodiment, the coaching items are planned with respect to the route set by the navigation device 18. However, the present invention is not limited to the configuration. For example, coaching items that are determined to be of low skill on a route that is passed through a predetermined number of times at the same time, such as commuting, may be executed regardless of the existence of navigation data.

Furthermore, although this embodiment assumes that the occupant drives a vehicle owned by him/her, the present invention is not limited to the configuration. For example, when the occupant drives a shared car, coaching may be performed according to the occupant's past skills stored in the cloud or the type of vehicle he/she has driven. Also, when a family member or other person drives a vehicle owned by him/her, coaching may be performed according to the past skills of the occupant and the type of vehicle driven in the past, which are in the vehicle or the cloud.

According to the embodiment described above, a coaching item including notification of warning information and a suggestion relating to driving of the host vehicle M is planned based at least on the route to the destination set by the occupant of the host vehicle M, and the coaching item is executed based on notification of the warning information and the suggestion relating to driving. In this way, it is possible to evaluate driving more flexibly.

The embodiment described above can be expressed as follows.

A driving support device comprising a storage device and a hardware processor, the hardware processor executing a program stored in the storage device to:

acquire, from a mobile object, information on existence of a specific situation on a planned travel route, which is set as a route to a destination set by an occupant of the mobile object;

plan a coaching item, including notification of warning information relating to traveling of the mobile object and suggestion relating to traveling of the mobile object, based at least on the information; and control a notification device so as to execute the notification and suggestion based on the planed coaching item.

This concludes the description of the embodiment for carrying out the present invention. The present invention is not limited to the embodiment in any manner, and various kinds of modifications and replacements can be made within a range that does not depart from the gist of the present invention.

What is claimed is:

1. A driving support device comprising a storage device and a hardware processor, the hardware processor executing a program stored in the storage device to:

acquire, from a mobile object, information on existence of a specific situation on a planned travel route, which is set as a route to a destination set by an occupant of the mobile object;

plan a coaching item, including notification of warning information relating to traveling of the mobile object and suggestion relating to traveling of the mobile object, based at least on the information; and control a notification device so as to execute the notification and suggestion based on the planed coaching item, wherein the storage device stores a driving skill level of the occupant, which has been evaluated when the mobile object has passed through the same situation as the specific situation, wherein the hardware processor determines, based on the driving skill level, whether or not to plan the coaching item corresponding to the specific situation, wherein a higher driving skill level is represented by a larger value, and wherein when the hardware processor is allowed to plan a plurality of coaching items corresponding to a plurality of specific situations within the same period, the hardware processor plans one coaching item out of the plurality of coaching items based on a first priority that gives a priority to a coaching item requiring a small driving skill level among the plurality of specific situations.

2. The driving support device according to claim 1,
wherein the storage device stores a driving skill level of the occupant, which has been evaluated when the mobile object has passed through the same situation as the specific situation, and
wherein the hardware processor determines, based on the driving skill level, whether or not to plan the coaching item corresponding to the specific situation.

3. The driving support device according to claim 2,
wherein the hardware processor determines not to plan the coaching item corresponding to the specific situation when the driving skill level is equal to or larger than a threshold value.

4. The driving support device according to claim 1, wherein the hardware processor plans one coaching item out of the plurality of coaching items based further on a second priority, which indicates a degree of necessity to ensure safety of the mobile object and is set for each of the plurality of specific situations.

5. The driving support device according to claim 4, wherein when the number of times of execution of a coaching item planned based on the second priority is equal to or larger than a threshold value, the hardware processor decreases the second priority of the coaching item.

6. The driving support device according to claim 4,
wherein the hardware processor acquires external information, which is information on objects around the mobile object,
wherein the hardware processor generates reference information indicating a specific situation based on the external information, and
wherein when the reference information satisfies a predetermined condition at the time of execution of a planned coaching item, the hardware processor stops executing the planned coaching item.

7. The driving support device according to claim 1, wherein the hardware processor displays, to the occupant, information asking whether or not the planned coaching item needs to be performed.

8. The driving support device according to claim 1,
wherein the specific situation is entry into a narrow road,
wherein the hardware processor causes the notification device to execute the notification at a location a predetermined distance before a location of entry into the narrow road, and
wherein when the mobile object enters into the narrow road, the hardware processor causes the notification device to execute a suggestion relating to an offset amount from a center line of a lane in which the mobile object is traveling.

9. The driving support device according to claim 8, wherein the hardware processor causes the notification device to execute the notification when a driving load imposed on the occupant is small at a location a predetermined distance before the location of entry into the narrow road.

10. A driving support method to be executed by a computer, the driving support method comprising:
acquiring, from a mobile object, information on existence of a specific situation on a planned travel route, which is set as a route to a destination set by an occupant of the mobile object;
planning a coaching item, including notification of warning information relating to traveling of the mobile object and suggestion relating to traveling of the mobile object, based at least on the information; and
controlling a notification device so as to execute the notification and suggestion based on the planed coaching item,
wherein the driving support method further comprises determining, based on a driving skill level of the occupant, which has been evaluated when the mobile object has passed through the same situation as the specific situation, whether or not to plan the coaching item corresponding to the specific situation,
wherein a higher driving skill level is represented by a larger value,
wherein the driving support method further comprises planning, when allowed to plan a plurality of coaching items corresponding to a plurality of specific situations within the same period, one coaching item out of the plurality of coaching items based on a first priority that gives a priority to a coaching item requiring a small driving skill level among the plurality of specific situations, and
wherein the driving support method further comprises planning one coaching item out of the plurality of coaching items based further on a second priority, which indicates a degree of necessity to ensure safety of the mobile object and is set for each of the plurality of specific situations.

11. The driving support method according to claim 10, further comprising:
decreasing, when the number of times of execution of a coaching item planned based on the second priority is equal to or larger than a threshold value, the second priority of the coaching item.

12. The driving support method according to claim 10, further comprising:
acquiring external information, which is information on objects around the mobile object;
generating reference information indicating a specific situation based on the external information; and stopping, when the reference information satisfies a predetermined condition at the time of execution of a planned coaching item, executing the planned coaching item.

13. A non-transitory storage medium having stored thereon a program for causing a computer to:
   acquire, from a mobile object, information on existence of a specific situation on a planned travel route, which is set as a route to a destination set by an occupant of the mobile object;
   plan a coaching item, including notification of warning information relating to traveling of the mobile object and suggestion relating to traveling of the mobile object, based at least on the information; and
   control a notification device so as to execute the notification and suggestion based on the planed coaching item,
   wherein the specific situation is entry into a narrow road,
   wherein the program further causes the computer to cause the notification device to execute the notification at a location a predetermined distance before a location of entry into the narrow road, and
   wherein when the mobile object enters into the narrow road, the program further causes the notification device to execute a suggestion relating to an offset amount from a center line of a lane in which the mobile object is traveling.

14. The non-transitory storage medium according to claim 13, wherein the program further causes the notification device to execute the notification when a driving load imposed on the occupant is small at a location a predetermined distance before the location of entry into the narrow road.

* * * * *